United States Patent [19]

Ray et al.

[11] 3,933,689
[45] Jan. 20, 1976

[54] FIRE RETARDANT COMPOSITIONS

[75] Inventors: Neil Hunter Ray; Bryan Shaw; Bruce Cochran Lane, all of Runcorn, England

[73] Assignee: Imperial Chemical Industries Limited, London, England

[22] Filed: May 23, 1973

[21] Appl. No.: 363,158

[30] Foreign Application Priority Data
June 8, 1972 United Kingdom............... 26806/72
Jan. 16, 1973 United Kingdom................ 2190/73

[52] U.S. Cl. .......... 260/2.5 FP; 106/15 FP; 106/47; 260/40 R; 260/DIG. 24
[51] Int. Cl.² ........................ C08K 3/32; C08K 3/40
[58] Field of Search ........ 260/40 B, DIG. 24, 40 R, 260/2.5 FP; 106/47, 15 FP

[56] References Cited
UNITED STATES PATENTS

| | | | |
|---|---|---|---|
| 2,754,217 | 7/1956 | Allen et al...................... | 106/15 FP |
| 3,630,764 | 12/1971 | Shannon ........................... | 260/40 R |
| 3,732,181 | 5/1973 | Roy et al........................... | 260/40 R |

OTHER PUBLICATIONS

S. Steiman et al., "Silane Coupling Agents", Industrial & Engineering Chemistry, Vol. 58, No. 3, (Nov. 1966), pp. 33–37.

*Primary Examiner*—Donald E. Czaja
*Assistant Examiner*—S. M. Person
*Attorney, Agent, or Firm*—Cushman, Darby & Cushman

[57] ABSTRACT

The addition of a low softening point glass of Tg 300°C and optionally a blowing agent, to a reinforced thermosetting composite material gives fire retardant properties to the product. Smoke emission on burning is less than for halogenated fire retardant additives. A preferred embodiment is GRP sheet containing a powdered phosphate glass and a blowing agent.

26 Claims, No Drawings

FIRE RETARDANT COMPOSITIONS

This invention relates to fire retardant plastics materials.

Many organic plastics materials are inflammable, and fire retardant grades of these materials may be obtained by the incorporation of conventional additives which are generally either inorganic, for example antimony oxide, or halogenated organic materials for example tris($\beta$-chloroethyl) phosphate. Additives of the former type, may, if used in large quantities, adversely affect the mechanical properties of the material and in any case are usually opacifying, while additives of the latter type tend to act as plasticisers, thereby lowering the modulus and heat distortion temperature of the material, and may also tend to be leached out from the material.

Glass-reinforced thermosetting resins, particularly unsaturated polyesters, are sometimes used in structural applications, in which their inflammability presents a severe disadvantage. The presence of the glass reinforcement does not give any significant degree of fire retardance; indeed the glass fibre may act as a wick and prolong the burning of the matrix material.

We have found that the incorporation of a glass of low softening temperature, particularly a phosphate glass, into a reinforced thermosetting resin confers a degree of fire retardance upon the cured material. The mechanism is believed to involve the melting of the low softening point glass with the approach of a flame and the formation of a protective skin of fused glass over the material. The glass is itself incombustible and tends to exclude oxygen from the rest of the material. Other mechanisms of fire retardance may also be operative, however, and theories as to the mechanism of the fire-retardant effect are not to be construed as limiting the invention in any way.

We have also found that the addition of a blowing agent, that is, a compound which decomposes upon heating to liberate one or more non-flammable gases, to a composite material comprising a lowsoftening point glass, may give an improved degree of fire retardancy to the cured product.

The softening point of a glass is a quantity defined by ASTM C338-57, but as it is more convenient to measure the transformation temperature (Tg) of a glass, a low softening point glass is considered to be one having a transformation temperature not greater than 300°C. An approximate correlation between softening point and transformation temperature is that the softening point is generally between 50° and 70°C above the transformation temperature.

The transformation temperature of a glass is defined herein as the value determined by differential calorimetry using the Du Pont Differential Thermal Analyser according to the following procedure: A sample of the powdered glass and a reference sample of pure powdered silica are heated at a programmed rate of temperature increase of 20°C/min, and a graph is obtained of the temperature difference between the samples plotted against the temperature of the reference sample. This curve typically has a linear portion of small slope and a second linear portion of larger negative slope at higher temperatures. The two linear portions are produced so that they intersect, and the transformation temperature is taken as the temperature corresponding to the point of intersection.

According to the present invention, therefore, we provide a reinforced thermosetting composite material containing a low softening point inorganic oxide glass having a transformation temperature not greater than 300°C.

The reinforcement may be in the form of fibres and/or flakes, and the low softening point glass may be in the form of particles, flakes and/or fibres. When the low softening point glass is present in the form of flakes and/or fibres, it may replace part or all of the reinforcement. Preferably, however, the reinforcement is in the form of fibres and the low softening glass is particulate.

The materials according to the invention will, when in the cured state, possess fire-retardant properties, by which it is meant that the material will have a lower rate of burning in a test, such as the Underwriters Horizontal Slow-Burning Test, than that of a comparable material in the absence of the low softening point glass, although it is preferred that materials according to the invention will be "self-extinguishing" and more preferably "non-burning" as defined by ASTM D 635-68.

Other tests of fire retardancey include the Oxygen Index Test, ASTM D 2863-70, in which the sample is burned in an oxygen/nitrogen atmosphere of controlled oxygen content, the oxygen index being the percentage by volume of oxygen in the atmosphere which is necessary to just support combustion of the sample.

Building materials are normally classified for fire retardancy in the United Kingdom according to British Standard 476, and for glass reinforced polyester sheeting the most relevant parts of BS 476 are part 3 (1958) (External Fire Exposure Roof Tests) and part 7 (1971) (Surface Spread of Flame). These tests are conducted on large samples, and are not suitable for routine laboratory testing. One GRP sheet material according to the invention gave results corresponding to AA on BS 476 part 3 and to class 2 on BS 476 part 7. However, other samples have been found to give oxygen indices of from 35 to 44% and it is generally considered that a material having an oxygen index in the range 35–40% or higher will normally show class 1 properties under BS 476 part 7.

Preferably, the low-softening point glass is a phosphate glass, that is, an inorganic oxide glass comprising at least 25 mole % of $P_2O_5$. Suitable glasses include any of the glasses described in our copending British Patent Application Nos. 18481/70, 48104/71, 48105/71, 6694/72 and 19560/72 having appropriate transformation temperatures.

More preferably, the glasses have a transformation temperature below 250°C and comprise at least 50 mole % $P_2O_5$, more preferably at least 60 mole % $P_2O_5$; they may in addition contain any or all of the elements B, Al, Li, Na, K, Mg, Ca, Sr, Ba Cd, Zn, Pb, V, Cr, W, Mo, Sb, Bi and/or hydrogen in the form of combined water. Mixtures of two or more such glasses may be used.

A fibre-reinforced thermosetting composite material according to the present invention comprises a matrix of a thermosetting resin and a discontinuous phase of reinforcing fibres. Examples of thermosetting resins include unsaturated polyester, epoxy resins, polyurethanes, phenol/formaldehyde resins including resoles and novolaks, mixtures of any of these and products obtained by reacting together the precursors of one type of resin with the precursors of another type. The matrix resin may be in the fully cured condition or may be partially cured ("B-staged") or even uncured, in which case the material may be brought into the fully cured condition by known curing methods for example, heat, catalysis and/or radiation. It is preferred that the low-softening point glass is selected so that its softening point is above the highest temperature likely to be reached during curing of the material, and when a blowing agent is present, it should be selected so that the temperature at which it begins to undergo significant decomposition with evolution of gas is also above the highest temperature likely to be reached during curing.

Although the cured material will have fire-retardant properties, the uncured or partially cured material may not. Thus the uncured material may contain considerable amounts of volatile inflammable monomer for example styrene, which would make any degree of fire retardance very difficult to obtain.

The reinforcing fibres are preferably of E glass, but may comprise fibres of other inorganic materials for example glass other than E glass, metals, boron and carbon, and may be in the form of continuous fibres, discontinuous fibres of various lengths, or a mixture of both continuous and discontinuous fibres.

The fibre-reinforced composite material should preferably have a combination of fibre content and fibre length such that when a sample of the unmodified material is burned it does not disintegrate completely, but leaves an integral residue of the reinforcing fibre approximately of the same dimensions as the original sample. When such a material, modified by the incorporation of a low softening point glass, is ignited, the matrix material will begin to burn, and the reinforcing fibres will provide a support upon which a protective skin of fused low-softening point glass can form, thereby giving the fire retardant properties characteristic of the material according to the present invention.

Preferably the reinforcing fibre content will be at least 5% by volume of the material, more preferably at least 10% by volume. The mean fibre length should preferably be at least 0.5 cm, more preferably at least 2.5 cm.

Examples of types of fibre-reinforced composite materials which may be modified by addition of low softening point glass to give fire retardant materials according to the invention include articles made by hand lay-up of glass-reinforced unsaturated polyesters in which the glass is in the form of continuous or chopped strand mat; sheet moulding compounds comprising chopped strand mat, fillers and partially cured resin, which may be shaped and cured by the application of heat and pressure; dough moulding compounds containing relatively short glass fibres, filler and partially cured resin; which may be fabricated into shaped articles; and filament-wound articles containing continuous glass, boron, metal or carbon fibres. Particularly preferred materials are flat or corrugated cured sheets of glass-reinforced polyester resin.

The low softening point glass to be incorporated into the fibrereinforced composite material is preferably in the form of a granular powder of particle size substantially in the range 100–300μm diameter. The glass may be granulated for example by a 2-plate grinding mill and then may be dispersed either in a liquid reactant which is then reacted with other components in order to produce the resin, or in the resin itself in an uncured liquid or semiliquid state. The dispersion of low softening point glass in the resin may then be added to or blended with the reinforcing fibres.

An alternative and less preferred procedure is to grind the low softening point glass to a fine powder, of particle size substantially in the range 1–75μm, for example by ball milling. It may then be desirable to mill the glass in the presence of up to 2% or even more by weight (based on the glass) of a dispersing aid for example Silanox hydrophobic silica (Cabot Corp) in order to improve the dispersion of the glass in the resin, particularly for acidic glasses containing over 65 mole % $P_2O_5$.

When the glass is prepared as a fine powder it is found that fire retardance is improved if the glass powder is aged by exposure to the atmosphere for a period of time, for example two weeks at room temperature or 1 hour at 110°C. This ageing process may occur even after the glass is incorporated in the composite material, thus for example a material which is burning by ASTM D 635 when freshly prepared may be self-extinguishing or even non-burning when tested after a period of time of, for example, several months.

As an alternative method of preparation of the fibre-reinforced material according to the invention, the low softening point glass may be added as a granular or a fine powder to a suitable form of reinforcement for example to E-glass mat, and the reinforcement carrying the low softening point glass may then be impregnated with resin. It may be desirable to treat the reinforcement carrying the low softening point glass with a binder before impregnation with resin, a suitable treatment being, for example, spray coating with a solution of polyvinyl acetate.

When the unmodified composite material contains inert fillers for example talc or dolomite, the powdered or granulated low softening point glass may replace part or all of the filler. The modulus of the material is generally not adversely affected by the incorporation of particulate low softening point glass. The proportion of low softening point glass present in the composite is preferably between 2 and 60% by weight of the matrix resin, more preferably between 10 and 30% by weight of the matrix resin.

The low softening point glass may be present in the form of fibres which may be added in finely chopped form to the matrix resin, or may replace part or all of the reinforcing fibres. Heterofil composite fibres having a high melting core, for example of E glass and a sheath of low softening point glass may also be used as reinforcement.

Although products according to the invention are fire retardant and preferably self-extinguishing or non-burning by ASTM D635-68 nevertheless if they are held in a flame or are in close proximity to other burning materials the resin component may be entirely consumed by fire. However, whenever high-melting reinforcing fibres are present the residue will normally be a mass of reinforcing fibres bonded together by fused low-softening point glass which may retain some degree of strength and load bearing ability. By contrast, an unmodified fibre-reinforced composite article will burn to give a residue of fibres which, while it may retain the shape and dimensions of the original article, will have little or no strength or capacity for load bearing, unless the temperature of the fibre was high enough to fuse the reinforcing fibres together.

Fire retardant fibre-reinforced materials according to the invention containing low softening point glass with or without a blowing agent may also contain conventional fire retardant additives for example halogenated polyolefins, antimony compounds and halogenated phosphate esters. Alternatively or in addition, the resin component may be made intrinsically fire retardant by incorporation of halogenated residues in the polymer chains. For example, a polyester resin may incorporate chlorendic acid residues:

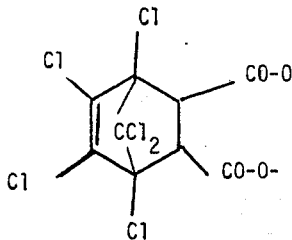

and such a modified resin may give a highly fire retardant fibre-reinforced composite material when low softening point glass is present. In particular, an E-glass reinforced polyester made with a chlorendic acid-modified resin and containing particulate low softening point glass and a blowing agent may have an oxygen index as high as 44%. Both the matrix resin and the low softening point glass may be transparent and the refractive index of the low softening point glass may be selected to match that of the cured resin; if E glass is also present the refractive indices of the cured resin and of the low softening point glass can be selected to match that of E glass. When the refractive indices are matched in this way, a translucent fire retardant composite product of low diffusion may be obtained, which may be for example translucent GRP sheet suitable for roofing applications. A preferred low softening glass composition contains (mole %) $P_2O_5$ 65.8, PbO 13.2, $Na_2O$ 9.4, $Li_2O$ 9.4, $B_2O_3$ 2.3, and has a refractive index of 1.546, compared with that of 1.545–1.549 for E glass. The low softening point glass may be coloured either by the incorporation of transition metal ions as described in British Patent Application No. 6694/72 or of organic or inorganic pigments in order to produce coloured products.

Composite materials incorporating particulate low softening point phosphate glass according to the present invention may be adversely affected by weathering, and this is particularly so for translucent GRP sheet products, the light transmission of which decreases and the degree of diffusion increases on exposure to water. These adverse effects are due at least in part to hydrolysis of the phosphate glass, and may be reduced by coating the phosphate glass particles with a hydrophobic material, or with a coupling agent which increases the bonding of the glass to the matrix resin.

Suitable materials include magnesium stearate and hydrophobic silicas, for example Silanox (Cabot Corp.). Suitable coupling agents include for example methacryloxypropyl trimethoxy silane, β-(3,4-epoxycyclohexyl)ethyl trimethoxy silane and glycidoxypropyltrimethoxy silane.

Solid coating agents for example Silanox may be added to the glass during granulation or ball milling or may be added subsequently to granulated glass and rolled with it to provide an even coating. Liquid coating agents, for example the above silanes, may be applied to the particulate glass in solution in an organic solvent, which is then removed by evaporation. The glass may first be treated with a reactive silicone primer, also applied in solution in an organic solvent.

Other methods of protecting the low softening point glass in the sheet product from water and thereby improving the weathering of the sheet include preparing the sheet with a resin rich gel coat and, more effectively, coating the sheet with a layer of waterimpervious material for example poly(vinylidene fluoride).

The effectiveness of coating agents may be determined by measuring the light transmission of a sample GRP sheet containing coated low softening glass particles before and after exposure in a weatherometer according to British Standard BS 3900 part F3 (1971), but a simpler test is that of water absorption at room temperature over 24 hours. (B.S. 2782 (1965), 502G), a high water absorption corresponding to poor weathering. Light transmission before and after exposure to water in this test may also be measured.

Blowing agents suitable for use according to the present invention are compounds, generally organic solids, which decompose on heating above a temperature between 150°C and 400°C with evolution of non-flammable gas for example ammonia, nitrogen, water or carbon dioxide. Such materials are known to be effective in combination with other known fire retardants for example ammonium phosphates, their mode of action being partly to provide a blanket of nonflammable gas and partly to cause the material to swell into an intumescent charred mass which is an effective thermal insulator.

A preferred blowing agent is dicyandiamide (DCDA), $NH_2.C(NH).NHCN$, and other blowing agents which are suitable include melamine, guanidinium carbonate, N-nitro-N'-cyano guanidine, uracil, barbituric acid and phosphoramide. Melamine has the greatest fire retardant effect as measured by ASTM D635 and also ASTM D2863-70 (oxygen index). However, DCDA is only marginally less effective, and has the advantage, in translucent sheet materials, of reducing the light transmission through the sheet by a smaller amount than does melamine.

The blowing agent may be added to the extent of between 2 and 20%, more preferably 5–10% by weight of the matrix resin, and conveniently is mixed in to the resin at the same time as the particulate low softening point glass. When DCDA is used as blowing agent, it is found that for a given total weight percentage of DCDA and low softening point glass in terms of the weight of resin, an optimum oxygen index is obtained when the weight ratio of DCDA to low softening point glass lies between 25:75 and 33:67.

Mixtures of two or more blowing agents may be used, and may be more effective than the same weight of a single blowing agent.

Many polymeric composite materials, including glass-reinforced polyester resins, generate large quantities of smoke on combustion. This presents an added hazard when such materials are present in a burning building, since the smoke may asphyxiate coccupants and may also obscure emergency exits. Furthermore, known fire retardant additives for example halogenated materials and antimony compounds usually increase the amount of smoke generated on combustion.

Fire retardant fibre-reinforced composite materials according to the present invention, however, generally give less smoke on combustion than do fire retardant materials containing conventional additives, and smoke generation may be reduced still further when a blowing agent is present in addition to the low softening point glass. In many cases the smoke generation on combustion of a fire retardant material according to the invention is significantly less than that for an unmodified composite material having no fire retardant properties. Furthermore, even when conventional fire retardant additives or resin components are present, the presence of low softening point glass, preferably together with a blowing agent, may lower the smoke generation considerably. For example, a chlorendic acid modified glass-reinforced polyester containing a phosphate glass and DCDA gave less smoke on combustion than did an unmodified GRP containing no fire retardant additives, low softening point glass or blowing agent.

Smoke generation on combustion is measured according to ASTM D 2843-70 in which the attenuation of a light beam across a confined space in which a sample of the material is burned is measured as a function of time. The maximum obscuration reached is measured, and in addition the "smoke density rating" is measured by integrating the area under the obscuration/time curve up to 4 minutes from the start of combustion. The rate of emission of smoke at a given time may also be measured from the slope of the curve, but this is not a part of the standard ASTM procedure.

Composite materials according to the invention may find application as, or in the manufacture of, composite structural and decorative members in buildings. In particular, translucent GRP sheet may be used for roofing the rooflights and opaque GRP sheet may be used for decorative panels.

The invention is further illustrated by the following Examples.

EXAMPLE 1 a. A phosphate glass made according to our copending British Patent Application No. 19560/72 and containing (mole %) 71.8% $P_2O_5$, 2.6% $B_2O_3$, 10.3% $Na_2O$, 10.3% $Li_2O$ and 5.1% BaO was ground to coarse particles (about 5–8 $B_{SS}$ mesh, 2.0–3.5 mm diameter) 2% by weight of "Silanox" (Cabot Corp.) hydrophobic silica was added and the mixture was ball milled until the average particle size of the glass was reduced to less than 75 microns.

An unsaturated polyester resin was made by mixing the following components.

|  | Parts by weight |
|---|---|
| Polyester resin BP 4128 (BIP Chemicals Ltd) | 60 |
| Methyl ethyl ketone peroxide | 0.6 |
| Accelerator B (BIP Chemicals Ltd) | 0.24 |

The glass powder (15 parts by weight) was then added and the mixture again well stirred. The dispersion of glass in resin was then incorporated with three 15cm square layers of glass mat (30 parts by weight, 14 parts by volume) using normal hand lay-up techniques in a suitable mould to give a finished flat plaque 150 × 150 × 3mm. The material was allowed to gel overnight and then cured for 5 hours at 80°C. The glass mat used was Fibreglass SuprEmat, a 5cm chopped strand mat with a PVA/silane finish, wt. 450 $gm^{-2}$.

b. A control plaque was made as above but substituting for the glass 15 parts by weight of dolomite powder.

Sample (a) containing low softening point glass was self-extinguishing (SE) by ASTM D 635-68, the length burned being 33mm in 4 minutes (average of 3 determinations).

The control sample (b) was burning (B) by this test, the burning rate being 15mm per minute. (Average of 3).

EXAMPLE 2

A glass-reinforced polyurethane/polyester sheet moulding compound containing low softening point glass was prepared by mixing:

|  | Parts by weight |
|---|---|
| An unsaturated polyester resin consisting of 62% by wt. of an unsaturated polyester of acid value 50.8 mg KOH/g and hydroxyl value 69.3 mg KOH/g formed from fumaric acid and isophthalic acid (in molar ratio 3:1) and propylene glycol; and 38% wt. of styrene | 65 |
| Triethylene glycol/hydroquinone (1:1) | 0.3 |
| t-butyl peroctoate | 1.0 |
| Dianol 33 oxypropylated bisphenol A (hydroxyl value 33mg KOH/g) | 22.2 | then adding 25.2 parts by weight of the low softening glass of Example 1, powdered as described above, and 126.7 parts by weight of BLR.3 stearate-coated calcium carbonate filler (Plastichem Ltd) and mixing thoroughly. 12.8 parts by weight of polymeric diisocyanatodiphenylmethane of average isocyanate functionality 2.7 (Suprasec DN, ICI Ltd) was blended with the mixture which was then added to two 23cm squares of SuprEmat chopped strand glass mat (60 parts by weight) and allowed to gel over-night. The sheet was cured by pressing at 135°C for 10 minutes at a pressure of 3.9 $MNm^{-2}$ to give a plaque 3mm thick.

A control plaque was also prepared using only BLR-3 filler (151.9 parts by weight) and no low softening point glass.

Three samples cut from each plaque were tested, all being self-extinguishing by ASTM D 635-68.

|  | Average Burning Time | Average Length Burned |
|---|---|---|
| Example 2 | 60 secs | 6mm |
| Control | 294 secs. | 50mm |

EXAMPLE 3

This example illustrates the use of small amounts of conventional fire-retardant additives in conjunction with a low softening glass in order to give improved fire-retardance.

A plaque was prepared as in Example 1 except that to the polyester resin was added 13 parts by weight of the powdered phosphate glass, 1.0 part by weight of antimony oxide ("Timonox" GS) (R.T.M.) and 1.0 part by weight of "Cereclor" 70 (chlorinated fire-retardant additive, Reg. Trade Mark of Imperial Chemical Industries Limited).

Samples cut from the plaque were non-burning (NB) by ASTM D635-68.

EXAMPLES 4-9

These examples illustrate the effect of blowing agents upon the fire retardancey of an E-glass reinforced polyester resin containing finely powdered low softening point glass.

The glass used was made according to our copending British Patent Application No. 19560/72, having the composition (moles %) $P_2O_5$ 65.8, PbO 13.2, $Na_2O$ 9.4, $Li_2O$ 9.4, $B_2O_3$ 2.3 and a Tg of 147°C It was ground to coarse particles (5–8 mesh B.S.S.) then ball milled to a particle size <75μm and aged by heating in air to 110°C for 1 hr.

blowing agent. Control C1 had no powdered glass, C2 had 20 parts by weight of powdered E-glass, and C3 had 20 parts by weight of the low softening glass powder. In Example 9 a mixture of two blowing agents was used, 3.5 parts by weight of each being present.

Samples were cut from each plaque for testing by ASTM D635-68 and ASTM D2863-70 (Oxygen Index) The latter test is generally regarded to be the more meaningful and reproducible of the two.

| Control or Example No. | Blowing Agent | No of samples averaged | ASTM D 635–68 | | | | ASTM D 2863–70 (oxygen index) % $O_2$ (mm) |
|---|---|---|---|---|---|---|---|
| | | | Burning Rate (mm/min) | Self-Extinguishing | | Non-Burning afterburn time (min) | |
| | | | | dist. burned (mm) | time (min) | | |
| C1 | -(unmodified) | 2 | 28 | — | — | — | not measured |
| C2 | -(E-glass powder) | 2 | 20 | — | — | — | 20.3 |
| C3 | -(LSG powder) | 3 | 13 | — | — | — | 23.1 |
| 4 | DCDA | 3 | — | 5 | 1.5 (one sample) | 1.65 (av. of 2 sam.) | 27.4 |
| 5 | Melamine | 3 | — | — | — | 1.2 | 28.7 |
| 6 | Guanidinium carbonate | 3 | — | 6 | 1.5 | — | 27.1 |
| 7 | uracil | 2 | — | 5 | 2.0 | — | not measured |
| 8 | phosphoramide | 3 | — | 13 | 1.8 | — | not measured |
| 9 | DCDA + melamine | 2 | — | — | — | 0.9 | 30.0 |

In these examples, unless otherwise stated, a standard GRP plaque was made by stirring together the following components:

| | Parts by weight |
|---|---|
| Polyester resin Crystic 195 (containing styrene and methyl methacrylate, and having when cured $n_D$ = 1.548, supplied by Scott Bader Limited) | 80 |
| Catalyst H paste (Scott Bader Ltd) | 1.7 |
| Accelerator E (Scott Bader Ltd) | 0.8 |
| Low softening point glass powder | 20 |
| Blowing agent | 7 | and impregnating three 15 cm square layers of SuprEmat (30 parts by weight, 13% by volume of the total material) with the mixture, using nomal hand lay-up techniques. The material was allowed to gel overnight then cured for 5 hours at 80°C, to give a 3mm thick plaque.

In addition, three control plaques were made up using the same weight of resin and E-glass, but without

EXAMPLE 10

This example illustrates the effect of ageing the composite material containing low softening point glass.

A series of four standard plaques was made as described for Example 4–9 using DCDA as blowing agent but using the glass of Example 1 freshly milled with 2% Silanox. A sample of each of two plaques was tested by ASTM D635-68 immediately, and a further sample from the same plaques was tested four months later, after storage in normal ambient conditions. The other two plaques were tested after 1 week and 4 months. The results are given below.

| Age | No samples averaged | Burning rate (mm/min) | Self-Extinguishing | | Non-burning afterburn time (min) |
|---|---|---|---|---|---|
| | | | Dist. burned (mm) | time (min) | |
| 0 | 2 | 12.5 | — | — | — |
| 1 wk. | 1 | 11 | — | — | — |
| | 1 | — | 8 | 2.5 | — |
| 4 mo. | 3 | — | 16 | 2.5 | — |
| | 1 | — | — | — | 1.25 |

EXAMPLE 11

This example illustrates the effect of ageing low softening point glass powder at 110°C before incorporation into the resin. The glass was that described in Examples 4–9 and after ageing standard plaques were made up as described for Examples 4–9; with DCDA as blowing agent. Two or three samples from wach plaque were tested by ASTM D635-68 with the following results.

| Treatment of glass | Burning rate (mm/min) | Self-Extinguishing | | Non-burning afterburn time (min) |
|---|---|---|---|---|
| | | dist. burned (mm) | time (min) | |
| freshly milled | 11 | | | — |
| | | 38 | 4.7 | |
| | | 25 | 3.8 | |
| aged at 110°C 30 min. | — | 13 | 2.3 | |
| | | | | 1.5 |

| Treatment of glass | Burning rate (mm/min) | Self-Extinguishing | | Non-burning afterburn time (min) |
|---|---|---|---|---|
| | | dist. burned (mm) | time (min) | |
| aged at 110°C 60 min. | — | | — | 1.5 |
| | | | | 1.8 |

EXAMPLES 12, 13

These examples illustrate the effect of the particle size of the low softening point glass upon the fire retardant properties of the product.

Two standard GRP plaques were made according to Examples 4–9, the 7 parts of blowing agent being made up of 2 parts DCDA and 5 parts melamine. In both cases the glass was that of Example 4, but for Example 12 the glass was ball milled powder, aged at 110°C for 30 min, while for Example 13 the glass was granulated and screened to B.S.S. mesh 60–85 (180-250µm approx. particle diameter).

| Example | ASTM D 635–68 | Oxygen Index |
|---|---|---|
| 12 | NB, 1.5 min afterburn | 29.2% |
| 13 | NB, 1.4 min afterburn | 31.6% |

EXAMPLES 14–16

These Examples illustrate the effect of the Tg of the low softening point glass upon the fire retardance of the product. The Tg of a glass of a given composition may be varied by altering the refining time.

Standard plaques were made as described in Example 13, using samples of glass of the composition described in Examples 4–9, but varying in Tg. The glass was granulated and sieved to 180–250µm particle size in all cases. Samples were tested by ASTM D2863-70.

| Example No | Tg of low softening point glass (°C) | Oxygen Index (%) |
|---|---|---|
| 14 | 108 | 35.4 |
| 15 | 139 | 29.2 |
| 16 | 189 | 25.6 |

Example 16 was self-extinguishing by ASTM D635-68, the others being non-burning.

EXAMPLES 17–25

These Examples illustrate the effect of varying the ratio of low softening point glass (LSG) to blowing agent. The resin was that described in Examples 4–9, the glass was as described in Example 13, and the blowing agent was DCDA. The quantities of low softening point glass and of DCDA added to 82.5 parts of catalysed resin and 30 parts of E-glas mat are shown below together with the results of ASTM D2863-70.

| Example No. | Total LSG + DCDA (pts. by weight) | LSG (pts by wt) | DCDA (pts by wt.) | DCDA:LSG | Oxygen Index |
|---|---|---|---|---|---|
| 17 | 20 | 18 | 2 | 10:90 | 26.6 |
| 18 | 20 | 13.5 | 6.5 | 32.5:67.5 | 28.2 |
| 19 | 20 | 10 | 10 | 50:50 | 25.5 |
| 20 | 27 | 25 | 2 | 7.4:92.6 | 28.7 |
| 21 | 27 | 20 | 7 | 26:74 | 31.2 |
| 22 | 27 | 18 | 9 | 33:67 | 28.8 |
| 23 | 35 | 30 | 5 | 14.3:85.7 | 29.6 |
| 24 | 35 | 26 | 9 | 25.7:74.3 | 33.3 |
| 25 | 35 | 20 | 15 | 43.57 | 29.6 |

EXAMPLES 26, 27

These Examples illustrate the increased fire retardance obtained when low softening point glass and blowing agent is used in conjunction with a chlorendic acid modified fire retardant polyester resin.

Plaques were made up as for Example 13, but in Example 26, the 80 parts of Crystic 195 was replaced by a mixture of 50 parts Crystic 195 and 30 parts of Crystic 302 (Scott Bader Ltd), a chlorendic acid modified unsaturated polyester resin. In Example 27, 80 parts of Crystic 302 were used. Burning test results are shown below, and compared with Example 13.

| Example No. | % modified resin | ASTM D635-68 | Oxygen Index (%) |
|---|---|---|---|
| 13 | 0 | NB, 1.4min afterburn | 31.6 |
| 26 | 37.5 | NB, 11sec. afterburn | 38.7 |
| 27 | 100 | NB, 0 afterburn | 44.4 |

EXAMPLES 28–30

These Examples illustrate the weathering of translucent GRP sheet according to the invention, and the use of coating agents to improve weathering.

Standard 3mm thick plaques were made up as described in Examples 4–9, using coated ball-milled low softening point glass, but no blowing agent. In addition, control plaques were made as C1, C2 and C3 in Examples 4–9, and as Example 12.

Specimens 50mm square were cut from the plaques, and three specimens of each plaque were tested. The light transmission of each specimen was measured water absorption was measured according to British Standard 2782 part 5 1965, 502G, and the light transmission was again measured.

To determine light transmission, the specimen is placed horizontally on a diffusing translucent surface illuminated from below by fluorescent light tubes so that the light transmitted through the surface is 180–200 lumens/ft$^2$ (1935–2150 lumens m$^{-2}$).

An E.E.L. photoelectric photometer cell is placed on the upper surface of the specimen so that the cell (approx. 40 mm diameter) is entirely within the perimeter of the specimen. The light intensity reading (x lumens/ft$^2$) is noted. The specimen is then removed without moving the cell and the new reading (y lumens/ft$^2$) is noted. The % transmittance of the specimen is then x/y × 100.

According to BS 2782 pt. 5, 502G, the three specimens are dried in an oven for 24 hours at 50°C, cooled in a dessicator, then placed in distilled water at 23°C for 24 hours. The specimens are then taken out, surface water is removed with filter paper, and the specimens are weighted within 1 minute ($W_1$). The specimens are then redried at 50°C for 24 hours, cooled in a dessicator and reweighed ($W_2$).

The water absorption is $W_1$-$W_2$ mg, the average of 3 results being taken.

EXAMPLES 32–34

These Examples illustrate the use of low softening point glasses other than those of Examples 1 and 4.

EXAMPLE 32

The glass used in this Example is a less preferred phosphate glass containing less than 60 mole % $P_2O_5$, having the composition (mole %) $P_2O_5$ 55.9, PbO 20.6, $B_2O_3$ 2.4, $K_2O$ 18.7, MgO 1.2, BaO 1.2, and a Tg of 205°C.

The glass was granulated and screened to 180–250μm particle size, and a standard plaque was made as described in Examples 4–9, using DCDA as blowing agent.

The sample was burning by ASTM D635-68, burning rate 16 mm/min. By comparison, the burning rate of control C2, incorporating E-glass powder, is 20 mm/min.

EXAMPLE 33

A glass having the composition (moles %) $P_2O_5$ 65.1, ZnO 9.3, $Li_2O$ 18.6, BaO 7.0, and a Tg of 225°C was ball milled and aged at 110°C for 30 min. A standard plaque was made as described in Examples 4–9, using 5 parts melamine 2 parts DCDA.

The sample was self-extinguishing by ASTM D635-68, dist. burned 61mm time 1.7 min. Oxygen index 26.6%.

EXAMPLE 34

The glass used in this example is a lead-free glass whose refractive index matches that of E glass. It has the composition (moles %) $P_2O_5$ 70.2, $Li_2O$ 10.0, $Na_2O$

| Control or Example No. | Glass Powder | Coating | blowing agent | Water absorp (mg) | Light Transmittance before | after |
|---|---|---|---|---|---|---|
| C1 | none | — | none | 25 | 85.5 | 84.4 |
| C2 | E-glass | none | none | 29 | 69.2 | 63.5 |
| C3 | milled LSG | none | none | 134 | 58.8 | 43.6 |
| 12 | ″ | none | DCDA/mel. | 165 | 48.9 | 34.9 |
| 28 | ″ | 2% hydrophobic silica | none | 40 | 52.3 | 49.5 |
| 29 | ″ | 2% Mg stearate | none | 42 | 66.0 | 64.0 |
| 30 | ″ | silicone/silane | none | 46 | 85.4 | 74.0 |

In Example 30, the coating used was 0.5% Reactive Silicone 133 (Union Carbide Co.) applied in 5% solution in ethanol, followed by 1% Silane A 174 (Union Carbide Co.) (methacryloxypropyl trimethoxysilane) applied in solution in ethanol.

It will be seen that coatings, particularly silanes, may improve the transmittance of the sheet before weathering as well as reducing the loss of transmittance due to weathering.

EXAMPLE 31

Commercial corrugated GRP translucent sheet is normally 1mm thickness. A sample of sheet of this thickness was made according to the invention, containing granulated low softening point glass as in Example 13 coated with silicone/silane system of Example 30, and DCDA as blowing agent, the DCDA particles also being coated with the silicone and silane.

The product has a light transmittance of 79% before weathering.

10.0, $B_2O_3$ 2.5, $Sb_2O_3$ 7.3, a Tg of 160°C and a refractive index of 1.547.

A standard plaque made using granulated glass of of 180–250μm particle size and 7 parts DCDA was self-extinguishing by ASTM D635-68 (3mm in 56 sec.) Its Oxygen Index was 28.8%, water absorption 71mg, initial light transmittance 52%, light transmittance after water absorption also 52%.

EXAMPLES 35, 36

These Examples illustrate the testing of GRP sheet according to the invention by B.S. 476 part 3 and part 7.

Sheets were made up with the following weights of components:

| | Weight (g) | |
|---|---|---|
| | Ex. 35 | Ex. 36 |
| Crystic 195 | 3500 | 1000 |
| Catalyst paste H | 35 | 10 |
| Accelerator E | 3.5 | 1 |
| low softening point glass as Ex. 4, | | |

-continued

|  | Weight (g) | |
|---|---|---|
|  | Ex. 35 | Ex. 36 |
| Tg 153°C ball milled and aged at 110°C | 875 | 250 |
| DCDA | 302 | 86.2 |
| SuprEmat | 1080 | 308 |

Ex. 35 gave a sheet 91.5cm square, 3mm thick which was tested by BS 476 part 3 and gave AA performance. A sample cut from the sheet had an oxygen index of 27.6%. Ex. 36 gave a sheet 915 × 254 × 3mm which was cut to 900 × 230mm and tested by BS 476 part 7, giving class 2 performance.

EXAMPLE 37

This Example illustrates the evaluation of smoke emission on combustion according to ASTM 2843-70, using specimens of certain earlier Examples and controls together with two new controls C4 and C5 containing no low softening glass but conventional fire retardant additives and chlorendic acid modified resin respectively.

The following Table gives the compositions of the specimens used and the results for maximum obscuration and smoke density rating by ASTM 2843-70.

|  | Example or control No. | C1 | C4 | C5 | 12 | 13 | 26 | 33 |
|---|---|---|---|---|---|---|---|---|
|  | Catalysed Crystic 195 | 82.5 | 82.5 | 52.2 | 82.5 | 82.5 | 52.5 | 82.5 |
|  | Crystic 302 (chlorendic acid modified) | — | — | 30 | — | — | 30 | — |
| parts by wt. | SuprEmat | 30 | 30 | 30 | 30 | 30 | 30 | 30 |
|  | Antimony oxide | — | 8 | — | — | — | — | — |
|  | Cerechlor | — | 8 | — | — | — | — | — |
|  | LSG (as Ex 4) aged) ball milled powder) | — | — | — | 20 | — | — | — |
|  | LSG (as Ex 4) granulated | — | — | — | — | 20 | 20 | — |
|  | LSG (as Ex 33) powder | — | — | — | — | — | — | 20 |
|  | DCDA | — | — | — | 2 | 2 | 2 | 2 |
|  | Melamine | — | — | — | 5 | 5 | 5 | 5 |
| ASTM 2843-70 | Max. obscuration % | 99 | 99.5 | 100 | 75 | 81 | 93 | 75 |
|  | Smoke density rating | 86 | 91 | 86 | 55 | 55 | 53 | 55 |

EXAMPLE 38

This Example illustrates an alternative method of preparation of GRP sheet containing LSG powder.

Low softening point glass of the composition given in Example 4, Tg 160°C, was granulated and sieved to 180–250μm, and 7.5g of the powder was sprinkled on to 10g SuprEmat (one 15cm square mat of 450 gm$^{-2}$). The mat bearing the LSG powder was then dipped through an emulsion of 0.25% polyvinyl acetate in water and dried at 80°C, 3 hour.

Three such mats were impregnated with 82.5g catalysed Crystic 195 containing 7.0g DCDA and cured in the normal way to give a 3 mm plaque. Specimens cut from the plaque were S.E. (3mm, 1.3min) by ASTM D 635-68.

EXAMPLE 39

This Example illustrates a thermosetting composite material containing low softening point glass fibres.

A low softening point glass as described in Example 4 was drawn into fibre on a fibre spinning apparatus with a 48-hole bushing, to give a 48 filament single end roving of fibre diameter 13μm. The filaments were sized with polyvinyl acetate emulsion before being gathered together. A similar roving was obtained from E glass by drawing and coating, the wind-up speed being adjusted to give approx 15μm diameter fibres.

Three ends of the E glass roving and 2 ends of the LSG roving were fed together into a compressed air driven chopping gun set to cut 5 cm lengths, and the chopped strands were sprayed on to a fine mesh screen with a partial vacuum applied to the under side. A random chopped strand mat weighing 750gm$^{-2}$ was obtained, which was sprayed with polyvinyl acetate emulsion and dried.

Catalysed Crystic 195 (82.5g) containing DCDA (7g) was used to impregnate 50g of the above mat, to give, after curing, a plaque containing 20g LSG fibres and 30g E glass fibres. Specimens cut from the plaque were NB (afterburn 1.7min) by ASTM 635-68, oxygen index

EXAMPLE 40

This Example illustrates the use of an epoxy resin as the thermosetting matrix.

10g of SuprEmat (one layer only) was impregnated with an epoxy resin prepared by mixing Araldite AV 100 (40g) and Araldite HV 100 (40g), and containing 20g of low softening point glass as Example 13, 2g DCDA and 5g melamine. The product was cured for 4 hours at 50°C. A control plaque (C6) was made in which the LSG and blowing agent were omitted.

|  | ASTM 635-68 | Oxygen Index |
|---|---|---|
| Ex. 40 | NB (afterburn 0.75 min) | 26.6% |
| C6 | B (25 mm/min) | 21.5% |

What we claim is:

1. A reinforced thermosetting composite material of improved fire retardance containing a thermosetting resin matrix, between 2 and 60% by weight, based on the weight of thermosetting resin matrix component, of a low softening point inorganic oxide glass having a transformation temperature not greater than 300°C and from 2 to 20% by weight, based on the weight of the thermosetting resin matrix component, of at least one blowing agent, which decomposes upon heating above a temperature between 150°C and 400°C with evolution of a non-flammable gas, the combination of said glass and blowing agent improving the fire retardance of the thermosetting resin matrix.

2. A material as claimed in claim 1 in which the low softening point glass has a transformation temperature not greater than 250°C.

3. A material as claimed in claim 1 in which the low softening point glass is a phosphate glass containing not less than 25 mole % $P_2O_5$.

4. A material as claimed in claim 3 in which the phosphate glass contains not less than 60 mole % $P_2O_5$.

5. A material as claimed in claim 4 in which the low softening point glass is present in the form of particles.

6. A material as claimed in claim 5 in which the diameters of the low softening point glass particles fall substantially within the range 100–300$\mu$m.

7. A material as claimed in claim 1 in which the low softening point glass is present to the extent of between 10 and 30% by weight of the matrix resin.

8. A material as claimed in claim 3 in which the phosphate glass is in the form of particles which are coated with a finely powdered solid hydrophobic material.

9. A material as claimed in claim 3 in which the phosphate glass is in the form of particles which are coated with an organosilane coupling agent.

10. A material as claimed in claim 1 in which the reinforcement is in the form of fibres.

11. A material as claimed in claim 10 in which the fibre reinforcement comprises E-glass.

12. A material as claimed in claim 10 in which the content of reinforcing fibres is at least 5% by volume of the material.

13. A material as claimed in claim 12 in which the mean length of the reinforcing fibres is at least 0.5cm.

14. A material as claimed in claim 13 in which the thermosetting matrix component is an unsaturated polyester resin.

15. A material as claimed in claim 14 in which the unsaturated polyester resin contains chlorendic acid residues.

16. An E-glass reinforced material as claimed in claim 11, in which the thermosetting matrix component is an unsaturated polyester resin, the resin and the low softening point glass being selected so as to have refractive indices in the range $N_D$=1.545–1.549, and the material being in the form of a translucent sheet.

17. A material as claimed in claim 16 in which the low softening point glass has the composition (moles %) $P_2O_5$ 65.8, PbO 13.2, $Na_2O$ 9.4, $Li_2O$ 9.4, $B_2O_3$ 2.3.

18. A material as claimed in claim 1 in which the blowing agent is present in the range of 5 to 10% by weight of the thermosetting matrix component.

19. A material as claimed in claim 1 in which the blowing agent comprises dicyandiamide.

20. A material as claimed in claim 19 in which the blowing agent comprises dicyandiamide and melamine.

21. A material as claimed in claim 19 in which the rati of the weight of blowing agent to the weight of low softening point glass lies between 25:75 and 33:67.

22. A method for the preparation of material as claimed in claim 5 comprising the steps of grinding a low softening point glass to particulate form, dispersing the particles and blowing agent in a liquid precursor of the thermosetting matrix, and impregnating the reinforcing component with the dispersion.

23. A method for the preparation of material as claimed in claim 5, comprising the steps of grinding a low softening point glass to particulate form, adding the particles and blowing agent to the reinforcing component, and impregnating the combination with a liquid precursor of the thermosetting resin.

24. A method as claimed in claim 22 in which the low softening point glass particles are coated with a material selected from finely powdered hydrophobic solids and organosilane coupling agents.

25. A method as claimed in claim 23 including the additonal step of coating the combination of low softening glass particles and reinforcement with a binding agent before impregnation with the resin precursor.

26. A material produced by the method of claim 20.

* * * * *